Figure 1:
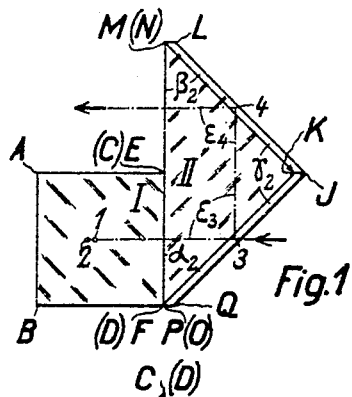

March 10, 1931.  A. KÖNIG  1,795,782
DIRECT VISION IMAGE REVERSING PRISM SYSTEM
Filed Jan. 11, 1929

Inventor:
Albert König

Patented Mar. 10, 1931

1,795,782

UNITED STATES PATENT OFFICE

ALBERT KÖNIG, OF JENA, GERMANY, ASSIGNOR TO THE FIRM OF CARL ZEISS, OF JENA, GERMANY

DIRECT VISION, IMAGE-REVERSING PRISM SYSTEM

Application filed January 11, 1929, Serial No. 331,798, and in Germany January 25, 1928.

The invention refers to a direct vision-, image-reversing prism system of the kind of a Porro prism system consisting of two double mirrors in cross-wise position to each other.

With the well-known Porro prism system the reflections take place under an angle of incidence of 45°. This has the disadvantage that with objectives of greater angles of aperture and in general with stronger inclinations of the rays to the axial ray, glass of high refraction must be taken for the prism in order to obtain a total reflection also of the inclined rays. This glass, however, is less transparent than the ordinary prism glass of low refraction.

According to the invention such prism system, partially or entirely, can be made of this ordinary glass, when altering the said well-known Porro system in such a way that at least two reflections will take place under an angle of incidence of more than 45° and that, in order to let a ray entering the system perpendicularly to the entrance surface of the ray, emerge from the system parallel to itself, at least the intersecting line of the mirrors of one of the two double mirrors is inclined to the entrance surface or the exit surface of the ray parallel to this surface. The inclination of the intersecting line is appropriately provided in that plane which is the symmetry plane to the two mirror planes of the double mirror. However, practically, only little is altered when choosing a plane which has a slight inclination to this symmetry plane.

When designing the prism system in such a way that only two reflections will result under an angle of incidence of more than 45° and that these two reflections take place on the mirrors of one and the same double mirror, whereas the said inclined intersecting line belongs to the other of the two double mirrors, at least for the first double mirror the ordinary prism glass can be taken. However, when designing the prism system in such a manner that only two reflections will result under an angle of incidence of more than 45° but in such a way that one of these two reflections takes place on one of the two mirrors of the one double mirror and the other on one of the two mirrors of the other double mirror, whereas the intersecting lines of the mirrors of each of the two double mirrors are inclined to the entrance surface of the ray, ordinary glass can be taken at least for the central part of the prism system, containing the second and the third reflecting surfaces of the system.

It is of special advantage to let all reflections take place under an angle of incidence of more than 45°. In this case the intersecting lines of the mirrors of each of the two double mirrors must be inclined to the entrance surface of the ray. Then, the entire prism system can be made of ordinary glass.

Figure 2:
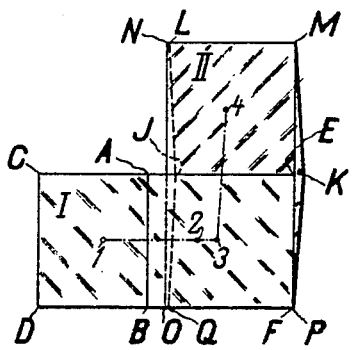
Figure 3:
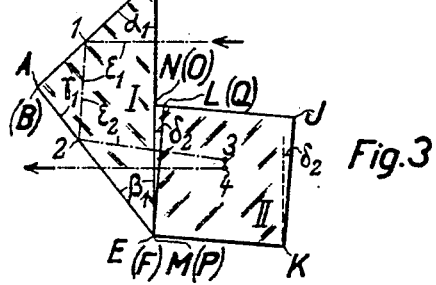

Figures 1 to 3 of the accompanying drawing represent one constructional example of the invention, whereby Fig. 1 is the front elevation, Fig. 2 the side elevation and Fig. 3 the cross section of a prism system, where only two reflections take place under an angle of incidence of more than 45°, viz. on the mirrors of one and the same double mirror, and where only the intersecting line of the other double mirror is inclined to the entrance surface of the ray.

The prism system consists of two prisms, I and II, cemented together. The prism I is bounded by two polished reflecting surfaces ABDC and ABFE, by the polished hypotenuse surface CDFE serving as entrance surface of the ray, and by two frosted surfaces ACE and BDF. Together with the reflecting surface ABDC the hypotenuse surface encloses the angle $\alpha_1 = 47°$ and together with the reflecting surface ABFE the angle $\beta_1 = 39°$, whereas the reflecting surfaces are inclined to each other under an angle $\gamma_1 = 94°$. Consequently, a ray entering the prism I perpendicularly to the hypotenuse surface CDFE will be reflected on the reflecting surface ABDC at 1 by the angle $\epsilon_1 = 94°$ and, thereupon, on the reflecting surface ABFE at 2 by the angle $\epsilon_2 = 94°$, so that its direction of emergence is inclined by 8° to the direction of entrance.

The prism II is bounded by two polished reflecting surfaces JKML, JKPQ, by the likewise polished hypotenuse surface MNOP and by four frosted surfaces JLNOQ, KMP, LMN and OPQ. The intersecting line JK of the two reflecting surfaces is inclined to the hypotenuse surface by the angle $\delta_2=4°$ in such a way that its projection, in front elevation (Fig. 1), will stand perpendicularly on the edge MP of the hypotenuse surface. The angles $\alpha_2$ and $\beta_2$ enclosed by the two reflecting surfaces and the hypotenuse surface, and the angle $\gamma_2$ enclosed by the two reflecting surfaces are chosen in such a way that the axial ray coming from the prism I and entering the prism II is reflected by the angle $\epsilon_3=90°$ at 3 on the reflecting surface JKPQ and by the angle $\epsilon_4=90°$ at 4 on the reflecting surface JKML in such a manner that, when the prisms I and II are placed to each other according to the Porro method, a ray entering the prism I perpendicularly to the hypotenuse surface is displaced parallel to itself when emerging from the prism II. The way of this ray is indicated by arrows. In the drawing the angles, as far as they do not represent the true angles but only projections, are in parentheses.

Another solution differing only very little from the one just described, can be derived from this solution in such a way that, instead of prism II, an ordinary, right-angled prism is taken the hypotenuse surface of which is sloped in such a manner that it is inclined to the intersecting line of the reflecting surfaces in the symmetry plane of the mirror plane by the angle $\delta_2=4°$. In this case the angles of deflection $\epsilon_3$ and $\epsilon_4$ would differ to a small extent from 90°.

Figure 4:
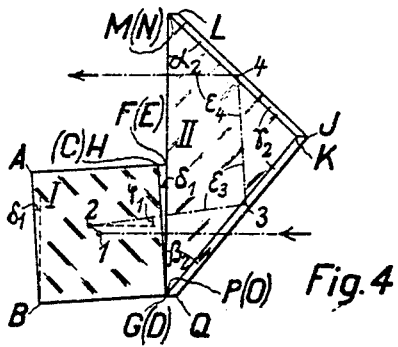
Figure 5:
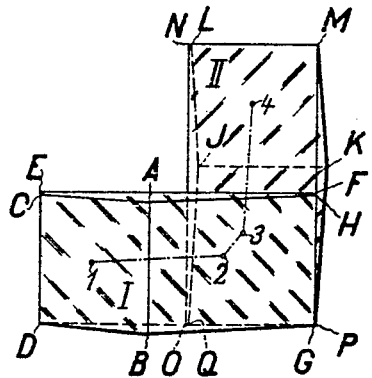
Figure 6:
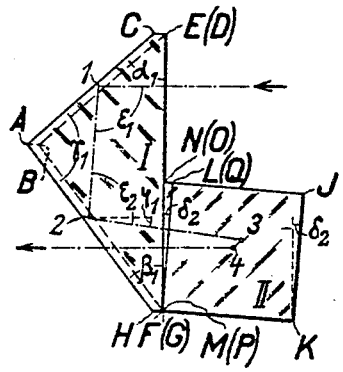

Figures 4 to 6 of the accompanying drawing represent another constructional example of the invention, whereby Fig. 4 is the front elevation, Fig. 5 the side elevation and Fig. 6 the cross section of a prism system, where all reflections take place under an angle of incidence of more than 45° and where the intersecting lines of the mirrors of each of the two double mirrors are inclined to the entrance surface of the ray.

The prism system consists of two prisms I and II, cemented together. The prism I is bounded by two polished reflecting surfaces ABDC and ABGH, by the hypotenuse surface DEFG serving as entrance surface for the ray, which is also polished, and by four frosted surfaces ACEFH, BDG, CDE and FGH. The intersecting line AB of the two reflecting surfaces is inclined to the hypotenuse surface by the angle $\delta_1=4°$ in such a way that, in the diagram (Fig. 6), its projection stands perpendicularly on the edge EF of the hypotenuse surface. The angles $\alpha_1$ and $\beta_1$ which are enclosed by the two reflecting surfaces together with the hypotenuse surface, and the angle $\gamma_1$ which is enclosed by the two reflecting surfaces, are chosen in such a way that a ray entering the prism I perpendicularly to the hypotenuse surface is reflected on the reflecting surface ABDC at 1 by the angle $\epsilon_1$ which is greater than 90°, and thereupon on the reflecting surface ABGH at 2 by the angle $\epsilon_2$ which is also greater than 90°, in such a way that, in the longitudinal section (Fig. 4) as well as in the diagram (Fig. 6), the said ray, when emerging from the prism, is inclined to its direction of incidence by the angle $\varphi_1=8°$.

The prism II is bounded by two polished reflecting surfaces JKML and JKPQ, by the likewise polished hypotenuse surface MNOP and by four frosted surfaces JLNOQ, KMP, LMN and OPQ. As regards its angles, the prism II coincides completely with the prism I and especially $\alpha_2=\alpha_1$, $\beta_2=\beta_1$, $\gamma_2=\gamma_1$, $\delta_2=\delta_1$. Correspondingly the angle $\epsilon_3$ by which the axial ray emerging from prism I and entering prism II is reflected on the reflecting surface JKPQ at 3, is equal to the angle $\epsilon_2$, and the angle $\epsilon_4$ by which thereupon the said ray is reflected on the reflecting surface JKML at 4, is equal to the angle $\epsilon_1$, so that the direction of the ray, when emerging from prism II, is parallel with the direction when entering prism I.

Altering by equal values $\beta_1$ and $\beta_2$ as well as $\gamma_1$ and $\gamma_2$ and altering correspondingly by equal values $\delta_1$ and $\delta_2$, the solution shown on the drawing can at once be transferred into another one where $\epsilon_2=\epsilon_3=90°$ so that, then, only two reflections take place under an angle of incidence of more than 45°, one of these two reflections taking place on the prism I and the other on the prism II.

I claim:

1. Direct vision-, image-reversing prism system of the kind of a Porro system consisting of two double mirrors in crosswise position to each other, the angles of the prism system differing from the values 45° and 90° respectively in such a way that at least two reflections will take place under an angle of incidence of more than 45° and that the intersecting line of the mirrors of at least one of the two double mirrors is inclined to the entrance surface of the ray.

2. Direct vision-, image-reversing prism system of the kind of a Porro system consisting of two double mirrors in crosswise position to each other, the angles of the prism system differing from the values 45° and 90° respectively in such a way that of the two reflections taking place on one double mirror each is covering an angle of incidence of more than 45° and that the intersecting line of the mirrors of the other double mirror is inclined to the entrance surface of the ray.

3. Direct vision-, image-reversing prism system of the kind of a Porro system consisting of two double mirrors in crosswise position to each other, the angles of the prism system differing from the values 45° and 90° respectively in such a way that all reflections take place under an angle of incidence of more than 45° and that the intersecting lines of the mirrors of each of the two double mirrors are inclined to the entrance surface of the ray.

ALBERT KÖNIG.